UNITED STATES PATENT OFFICE.

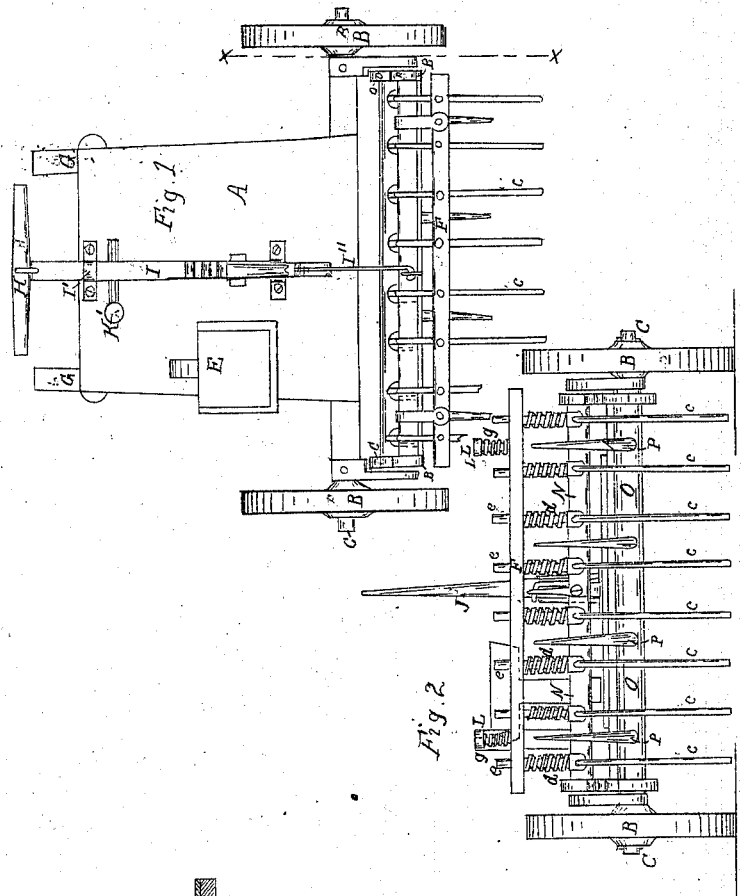
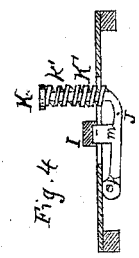
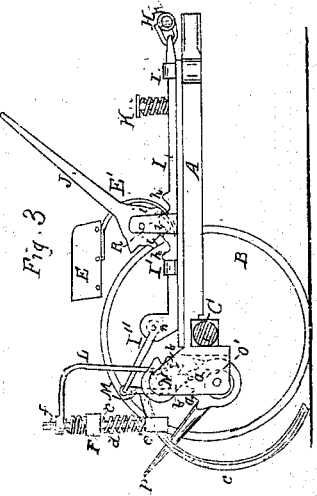

M. RAEZER, OF READING, PENNSYLVANIA.

IMPROVEMENT IN HORSE HAY-RAKES.

Specification forming part of Letters Patent No. 26,294, dated November 29, 1859.

*To all whom it may concern:*

Be it known that I, MATHIAS RAEZER, of Reading, in the county of Berks and State of Pennsylvania, have invented certain new and useful Improvements in Horse Hay-Rakes; and I do hereby declare the following is a full, clear, and exact description of the same, reference being had to the accompanying drawings, and to the letters and figures of reference marked thereon, the same making a part of this specification.

In the said drawings, Figure 1 is a plan or top view. Fig. 2 is a rear view. Fig. 3 is a longitudinal section on line $x\,x$ of Fig. 1; and Fig. 4 is a transverse section, showing the application of the spring foot-lever and catch for controlling the rake.

The same letters of reference denote like parts in each figure.

To enable others skilled in the art to make and use my invention, I will proceed to describe it with reference to the drawings.

In the said drawings, A is the main frame or platform of the machine; B B, the bearing-wheels; C, the axle of said bearing-wheels. E is the driver's seat, supported from platform A by the spring E'. G G are the shafts, to which the horse is attached; H, the single-tree which is attached to the sliding bar I, which bar is moved back and forth through the guides I'. This bar I is connected by the link I'' to the arm M on the rock-shaft N, said rock-shaft serving as the rake-head, and to which the rake-teeth $c$ are applied in any usual or well-known manner of applying such teeth. These teeth pass through the enlarged parts or heads of the pins $e$. Said pins pass through a spring-bar, F, and slide freely therein. Spiral springs $d$ are placed on the pins $d$, between the spring-bar and the heads $e$ of the pins, which springs bear the teeth against the ground with a yielding pressure. A greater degree of elasticity is given to this yielding pressure of the teeth upon the ground by means of the springs $g$ on pins $f$. These pins pass through brace-guides L, which are attached to the rock-shaft on the rake-head N.

To each end of the rake-head N segment or part pinions N' are applied, the teeth $b$ of which mesh with the teeth $a$ of similar segments O' on the rock-shaft O. Said rock-shaft O is provided with the clearers P, which pass between the teeth of the rake, and serve, when the rake is thrown up, to clear the grass from the teeth.

J is a hand-lever, which is pivoted to the standards R on the main frame. The short arm of said lever is in the form of a segment, and is furnished with the teeth $i\,i$, which teeth mesh into the teeth $h$ of the rack on bar I, and through which motion is given to the said bar through the guides I'.

K is a spring foot-lever, which passes through the platform at K', and is bent as shown at $j$, Fig. 4, and is pivoted at $k$ to the platform.

$k'$ is a spring, which serves to hold the lever in position to retain the catch $m$ thereon in a notch or groove in the bar I, when said bar is thrown back, so as to allow the teeth of the rake to rest upon the ground.

The operation is as follows, viz: The draft is applied through the single-tree H to the bar I, which is now thrown back and retained in the position shown in Fig. 3, by the catch $m$ on the foot-lever K, and the machine is drawn forward until a sufficient quantity of grass is collected thereon, when the driver presses his foot upon the lever K, releasing the catch $m$ from the notch in the bar I, when said bar is drawn forward, and acts through the link I'' upon arm M of the rake-head N, causing the rake-head partially to revolve, thereby throwing up the rake-teeth, and at the same time, through the teeth $a$ and $b$ on the segments N and O, the clearers P on the rock-shaft O are caused to move in an opposite direction, and thus to clear the grass from the teeth of the rake. This motion of the bar I, through the teeth $h$ thereon and the teeth $i$ on the short arm of the lever J, causes the long arm of the lever to be thrown back in convenient position to be seized by the driver. The teeth of the rake being now cleared, the driver forces forward the lever J, thereby bringing the bar again into the position shown in Fig. 3, where it is again retained, as before, by the spring-catch on the foot-lever, and the process is as before.

I have shown the bar as resting upon the platform; but it is obvious that the said bar may be placed underneath the platform without in any way changing the character of the invention.

What I claim, and desire to secure by Letters Patent, is—

The combination of the rock-shafts N and O, clearers P, teeth c, brace-guides L, spring-bar F, pins e and f, springs d and g with the draft-bar I, when the several parts are arranged and operated in the manner and for the purpose described.

MATHIAS RAEZER.

Witnesses:
WM. B. SCHOENER,
CHRISTIAN SNYDER.